(12) United States Patent
Davies et al.

(10) Patent No.: US 12,429,339 B2
(45) Date of Patent: Sep. 30, 2025

(54) SYSTEMS AND METHODS FOR ROUTE GUIDANCE THROUGH A WATERWAY

(71) Applicant: Ditch Technology Inc., Greenwich, CT (US)

(72) Inventors: Owen Davies, Greenwich, CT (US); Peter Williams, Irvington, NY (US)

(73) Assignee: Ditch Technology Inc., Greenwich, CT (US)

( * ) Notice: Subject to any disclaimer, the term of this patent is extended or adjusted under 35 U.S.C. 154(b) by 105 days.

(21) Appl. No.: 18/143,826

(22) Filed: May 5, 2023

(65) Prior Publication Data

US 2024/0302170 A1 Sep. 12, 2024

Related U.S. Application Data

(60) Provisional application No. 63/489,038, filed on Mar. 8, 2023.

(51) Int. Cl.
*G01C 21/20* (2006.01)

(52) U.S. Cl.
CPC ................... *G01C 21/203* (2013.01)

(58) Field of Classification Search
CPC .................................................. G01C 21/203
See application file for complete search history.

(56) References Cited

U.S. PATENT DOCUMENTS

| | | | |
|---|---|---|---|
| 9,852,547 B2 * | 12/2017 | Bostick | G06Q 50/01 |
| 2017/0314944 A1 * | 11/2017 | König | G01C 21/3415 |
| 2017/0314945 A1 * | 11/2017 | König | G01C 21/3461 |
| 2021/0387704 A1 * | 12/2021 | Ramage | B63B 49/00 |

* cited by examiner

*Primary Examiner* — Brian P Sweeney
(74) *Attorney, Agent, or Firm* — Wolf, Greenfield & Sacks, P.C.

(57) ABSTRACT

The present invention relates to a system for providing route guidance through a waterway to a user. The system comprises: an interface comprising a plurality of display elements, the display elements being configured to: display a map of the waterway and surrounding area; receive an origin and a destination on the waterway from the user; display a control enabling the user to request route guidance from the origin to the destination through the waterway; display on the map of the waterway a plurality of routes taken between the origin and destination by a plurality of corresponding navigators; identify at least one of the plurality of routes taken by at least one of the plurality of navigators having local knowledge of the waterway; and display at least one recommended route from the origin to the destination.

22 Claims, 8 Drawing Sheets

SYSTEMS AND METHODS FOR ROUTE GUIDANCE THROUGH A WATERWAY

RELATED APPLICATIONS

This application is a Non-Provisional of Provisional (35 USC 119(e)) of U.S. Application Ser. No. 63/489,038, filed Mar. 8, 2023, entitled "SYSTEMS AND METHODS FOR NAVIGATION", which is hereby incorporated by reference in its entirety.

BACKGROUND OF THE INVENTION

It is appreciated that conventional methods and systems for navigation do not make use of historical path data. Conventional marine navigation systems, for example, suggest routes using recorded depths and Aids To Navigation (ATONs) and perhaps user-reported depth soundings as their principal input. These conventional marine navigation systems determine suggested routes based on depth data that may have been obtained years or even decades earlier. These conventional methods and systems do not have the capabilities and features needed to recommend paths to a navigator based on paths taken in the past by other navigators.

The inventors have recognized that navigation generally and marine navigation in particular has unique characteristics that could benefit from considering the paths that other navigators have taken in the past. That is, a navigator could benefit from the knowledge and experience acquired by other navigators, particularly those in the same area and/or those with a similar vessel type for which navigation assistance is sought.

Accordingly, there exists a need for systems and methods to provide navigation assistance using the knowledge and experience of navigators, including the paths they have taken in the past.

SUMMARY OF THE INVENTION

In some aspects described herein, a system is provided for giving route guidance through a waterway to a user comprising: an interface comprising a plurality of display elements, the display elements being configured to: display a map of the waterway and surrounding area; receive an origin and a destination on the waterway from the user; display a control enabling the user to request route guidance from the origin to the destination through the waterway; display on the map of the waterway a plurality of routes taken between the origin and destination by a plurality of corresponding navigators; determine whether at least one of the plurality of routes has been taken by at least one of the plurality of navigators having local knowledge of the waterway; and display at least one recommended route from the origin to the destination.

In some embodiments, upon determining that the at least one of the plurality or routes has been taken by the at least one of the plurality of navigators having local knowledge of the waterway, identifying the at least one of the plurality of routes by displaying the at least one of the plurality of routes with a first predetermined color.

In some embodiments, the display elements are further configured to: display the at least one recommended route from the origin to the destination with a second predetermined color. In some embodiments, the display elements are further configured to: display one or more options for filtering the plurality of routes taken between the origin and destination by the plurality of corresponding navigators.

In some embodiments, the one or more options for filtering the plurality of routes taken between the origin and destination by the plurality of corresponding navigators comprises a boat size, a route type, and a route date or other factors such as vessel type, speed over ground, and heading that may be relevant for marine navigation. In some embodiments, the boat size comprises a plurality of values comprising small, medium, and large. These sizes are user-configurable, defaulting to less than 10 meters, 10-20 meters, and above 20 meters in vessel length. In some embodiments, the route type has a plurality of possible values comprising local knowledge and recommended route.

In some embodiments, the display elements are further configured to: display one or more options for the origin and the destination. In some embodiments, the one or more options for the origin and destination comprise a location and an area range surrounding the location. In some embodiments, the map of the waterway and surrounding area comprises a normal, satellite, or bathymetric nautical navigation view based on the user's selection.

In some embodiments, the display elements are further configured to: receive a plurality of intermediate points between the origin and the destination on the waterway from the user; display a control enabling the user to request route guidance from a first one of the plurality of intermediate points to a second one of the plurality of points through the waterway; display on the map of the waterway a plurality of intermediate routes taken between the first one of the plurality of intermediate points and the second one of the plurality of intermediate points by a plurality of corresponding navigators; determine whether at least one of the plurality of intermediate routes has been taken by the at least one of the plurality of navigators having local knowledge of the waterway; and display at least one recommended intermediate route from the first one of the plurality of intermediate points to the second one of the plurality of intermediate points.

In some embodiments, a method is provided for giving route guidance through a waterway comprising: receiving an origin and a destination on a waterway; receiving data relating to a plurality of routes taken between the origin and the destination by a plurality of corresponding navigators; determining whether at least one of the plurality of routes has been taken by at least one of the plurality of navigators having local knowledge of the waterway; and determining at least one recommended path from the origin to the destination based on the at least one of the plurality of routes.

In some embodiments the method for giving route guidance through a waterway further comprises: filtering at least a portion of the data relating to a plurality of routes taken between the origin and the destination by a plurality of corresponding navigators that does not satisfy one or more criteria. In some embodiments, the criteria comprises one or more of: a boat size, a voyage date, a direct path from the origin to the destination, and non-redundancy.

In some embodiments, the data relating to a plurality of routes taken between the origin and the destination by a plurality of corresponding navigators originates from one or more sources. In some embodiments, the one or more sources comprises automatic identification system (AIS).

In some embodiments, identifying at least one of the plurality of routes taken by at least one of the plurality of navigators having location knowledge of the waterway comprises: determining that the at least one of the plurality of routes taken by at least one of the plurality of navigators has the location knowledge if said at least one of the pluralities of navigators has traveled in an area of the origin and destination a predetermined number of times, or has a home port near the area of the origin or the destination.

In some embodiments, the method for providing route guidance through a waterway of further comprises: determining a score measuring an amount of the local knowledge for the at least one of the navigators having local knowledge of the waterway. In some embodiments, the determining at least one recommended path from the origin to the destination is also based on the score measuring an amount of the local knowledge for the at least one of the navigators having local knowledge of the waterway.

In some embodiments, the determining at least one recommended path from the origin to the destination comprises: performing curve fitting of the plurality of routes taken between the origin and the destination by a plurality of corresponding navigators. Additionally, the plurality of routes may be clustered or grouped into sets corresponding to potential paths to be analyzed for the recommended route.

In some embodiments, a method for providing route guidance through a waterway further comprises: receiving a plurality of intermediate points between the origin and the destination on the waterway from the user; receiving data relating to a plurality of intermediate routes taken between a first one of the plurality of intermediate points and a second one of the plurality of intermediate points by a plurality of corresponding navigators; determining whether at least one of the plurality of intermediate routes has been taken by the at least one of the plurality of navigators having local knowledge of the waterway; and determining a least one recommended intermediate path from the first one of the plurality of intermediate points to the second one of the plurality of intermediate points based on the at least one of the plurality of intermediate routes.

In another aspect of the present invention, a non-transitory computer-readable media is provided comprising instructions that, when executed by one or more processors on a computing device, are operable to cause the one or more processors to execute the methods described above and herein.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION OF INVENTION

The present invention includes systems and methods for providing navigation path recommendations to a navigator that considers paths taken by other navigators in the past, particularly those in the same area within which navigation assistance is sought. In this manner, a navigator can benefit from the knowledge and experience of other navigators.

An exemplary system of the present invention may include an exemplary cross-platform marine navigation software application. In one embodiment, the software application may be available on Android-based devices, Apple devices, and/or the world wide web via a web browser. As explained in detail below, the exemplary software application requests, upon a request from a user, a feed of Automatic Identification System (AIS) data. AIS is a shipboard broadcast system that acts like a transponder, operating in the VHF maritime band, that is capable of handling well over 4,500 reports per minute and updates as often as every two seconds and uses Self-Organizing Time Division Multiple Access (SOTDMA) technology to meet this high broadcast rate and ensure reliable ship-to-ship operation, as explained in https://www.navcen.uscg.gov/automatic-identification-system-overview, the contents of which are herein incorporated by reference in their entirety.

AIS is a Very High Frequency (VHF) and satellite tracking system traditionally used for collision avoidance, and to allow maritime authorities to track and monitor vessel movements. The International Maritime Organization's International Convention for the Safety of Life at Sea requires AIS to be fitted aboard commercial craft. AIS is increasingly common in recreational craft as well because of the convenience and safety it offers the broader boating community.

In one embodiment of the present invention, the AIS data may be fitted to a curve so that a user may visualize the paths that have been historically taken by other boats through a particular area. In one embodiment, the system of the present invention may maintain cloud-based servers that process raw AIS data, categorize the data based on relevance to a user, remove outliers, group or cluster similar paths, and use an algorithms to fit a curve that can be shown in the software application as a suggested path. Conventional marine navigation systems that suggest routes use recorded depths and Aids To Navigation (ATONs) or perhaps user-reported depth soundings as their principal input. These conventional marine navigation systems determine suggested routes based on depth data that may have been obtained years or even decades earlier.

The exemplary embodiments of the present invention are not so limited. Rather they also use AIS data for suggesting routes and for presenting graphical illustrations of suggested routes. An exemplary system of the present invention may mine a vast set of AIS location data that may be available in real-time or near real-time, uses this AIS location data to generate suggested routes, and presents graphical illustrations of the suggested routes to gather and summarize the collective knowledge of the most experienced navigators. In some embodiments, the present invention may use a third-party Application Programming Interface (API) such as Google Maps, Apple Maps, or MapBox.

Figure 1:
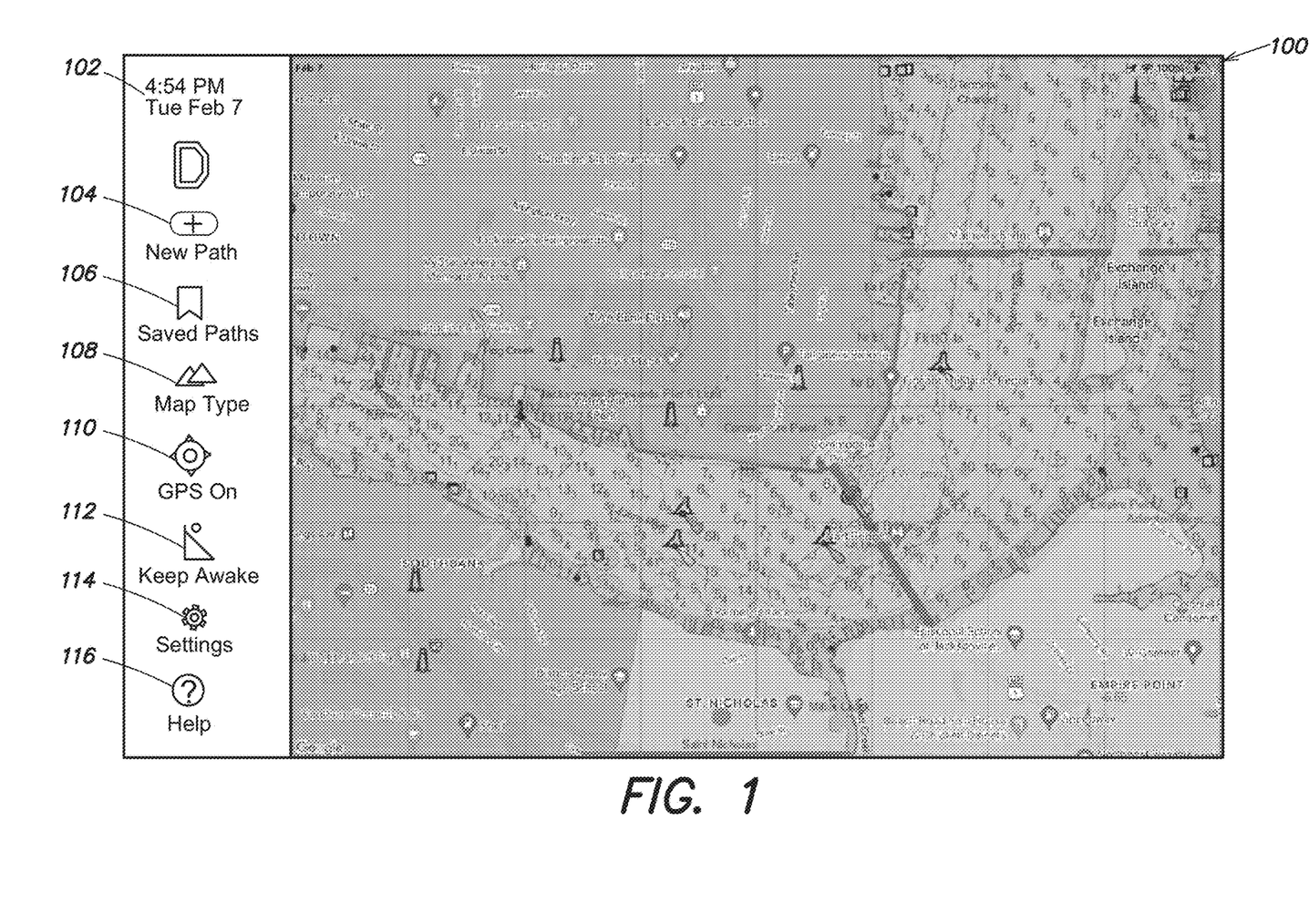
FIG. 1 shows an exemplary page of an exemplary interface displaying a map and command bar.

FIG. 1 shows an exemplary page of an exemplary interface 100 displaying a map and command bar. The map of the exemplary page of the exemplary interface 100 may include an image of a body of water such as a river, land surrounding the body of water, bridges over the body of water, etc. The command bar may include one or more of the following: a time and date 102, a New Path symbol 104, a Saved Paths symbol 106, a Map Type symbol 108, a Global Positioning System (GPS) On symbol 110, a Keep Awake symbol 112, a Settings symbol 114, and a help symbol 116.

In one embodiment of the exemplary interface of the present invention, a user may select the New Path symbol 104 to initiate a request for suggested routes, as explained in detail below. For example, a user may select origin and destination points for the suggested routes. In one embodiment, AIS data may be fetched and graphically presented to the user on the map.

In one embodiment of the exemplary interface of the present invention, a user may select the Saved Paths symbol 106 to display routes that the user may have previously saved. In one embodiment, the user may select the Map Type symbol 108 to select a view type. Exemplary view types include a normal map view as pictured in FIG. 1, a satellite view, and a navigation view. In one embodiment, the system of the present invention uses a S-57 vector navigation chart format, which are available free of charge in the United States as explained in NOAA (https://nauticalcharts.noaa.gov/charts/noaa-enc.html), the contents of which are herein incorporated by reference. These charts may also be obtained from other sources for areas outside of the US.

In one embodiment of the exemplary interface of the present invention, a user may select the GPS On symbol 110 to keep the user's position at the center of the map during travel. In one embodiment, a user may select the Keep Awake symbol 108 to prevent the screen from being dimmed to save power. On one embodiment, a user may select the Settings symbol 114 to access, modify, and save various configuration parameters, such as commonly-used filters and units of measure. In one embodiment the Settings symbol 114 is a gear symbol. In one embodiment, a user may select the Help symbol 116 to see an animated description of a workflow and/or a feature set of the exemplary application of the present invention.

Figure 2:
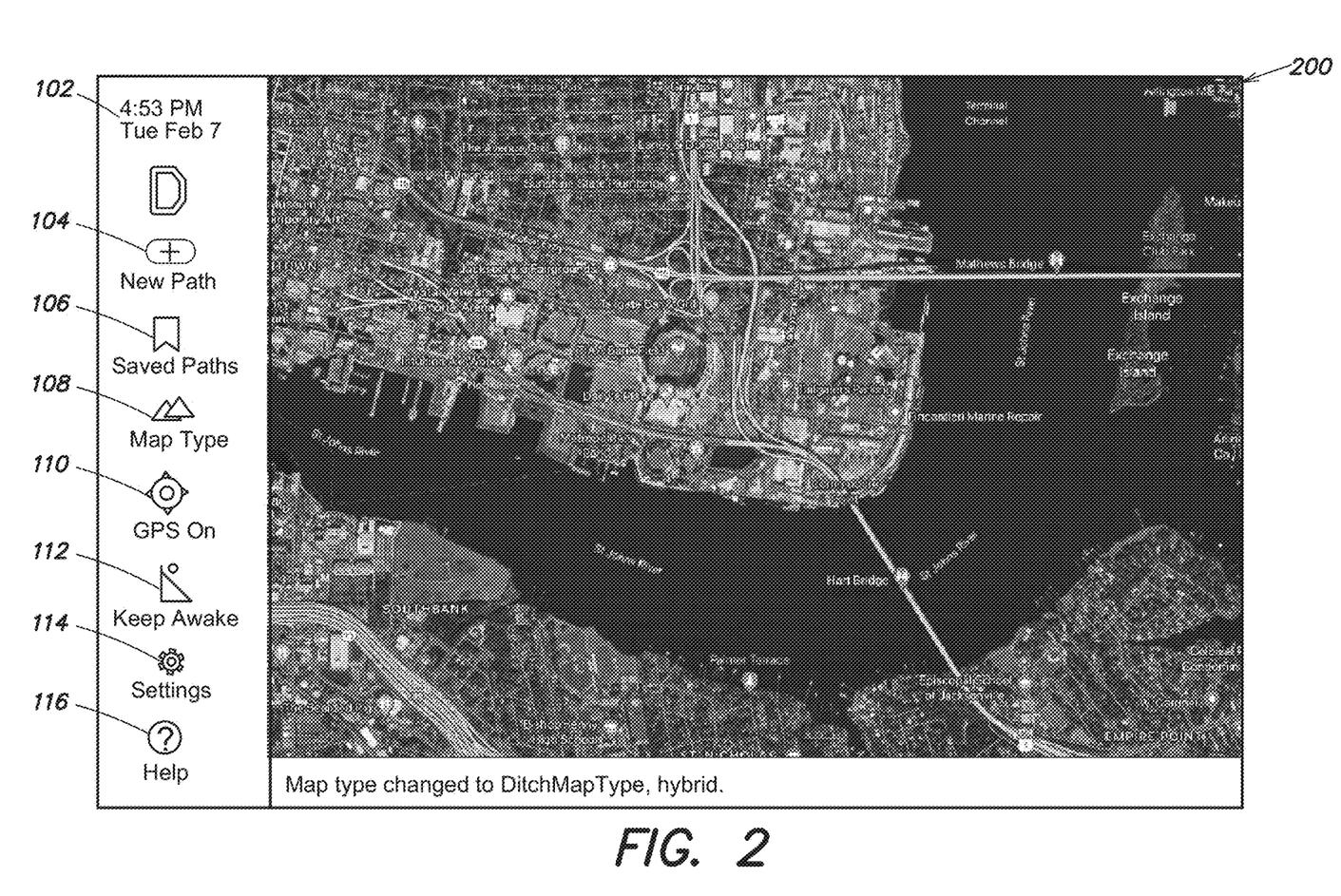
FIG. 2 shows an exemplary page in an exemplary interface displaying a satellite image and command bar.

FIG. 2 shows an exemplary page in an exemplary interface displaying a satellite image and command bar 200. In one embodiment, the user may display the satellite image by selecting it as a view type after selecting the Map Type symbol 108. In one embodiment, the satellite image includes names of the bodies of water (e.g., St. John's River, Terminal Channel) in the displayed satellite image, names of bridges over a body of water (e.g., Hart Bridge, Matthews), point of interest associated with a body of water (e.g., points of interest-docks, harbors, and anchorages), and names of various places of interest on the land surrounding the body of water (e.g., Metropolitan Park, Bishop Kenney High School). In some embodiments for some regions, the exemplary interface displaying a satellite image 200 may show relative water depths at various location on the body of water. In one embodiment, the relative depths may be represented by a color of the water (e.g., a lower depth represented by a lighter color, a higher depth represented by a darker color).

In one embodiment, the command bar of the exemplary interface 200 of FIG. 2 may include one or more of the following: a time and date 102, a New Path symbol 104, a Saved Paths symbol 106, a Map Type symbol 108, a Global Positioning System (GPS) On symbol 110, a Keep Awake symbol 112, a Settings symbol 114, and a help symbol 116.

In one embodiment of the exemplary interface of the present invention, a user may select the New Path symbol 104 to initiate a request for suggested routes. In one embodiment, an exemplary software application of the present invention prompts a user to identify a start location (i.e., origin) and end location (i.e., destination) between which the user would like to receive historical routing information. In one embodiment, a user may select the origin and destination by touching locations on the displayed map on a touch screen. Upon receiving the selected origin and destination of the desired historical routes from a user, the requested historical maps may be retrieved and displayed on the map of the exemplary interface by an exemplary embodiment of a software application of the present invention.

Figure 3:
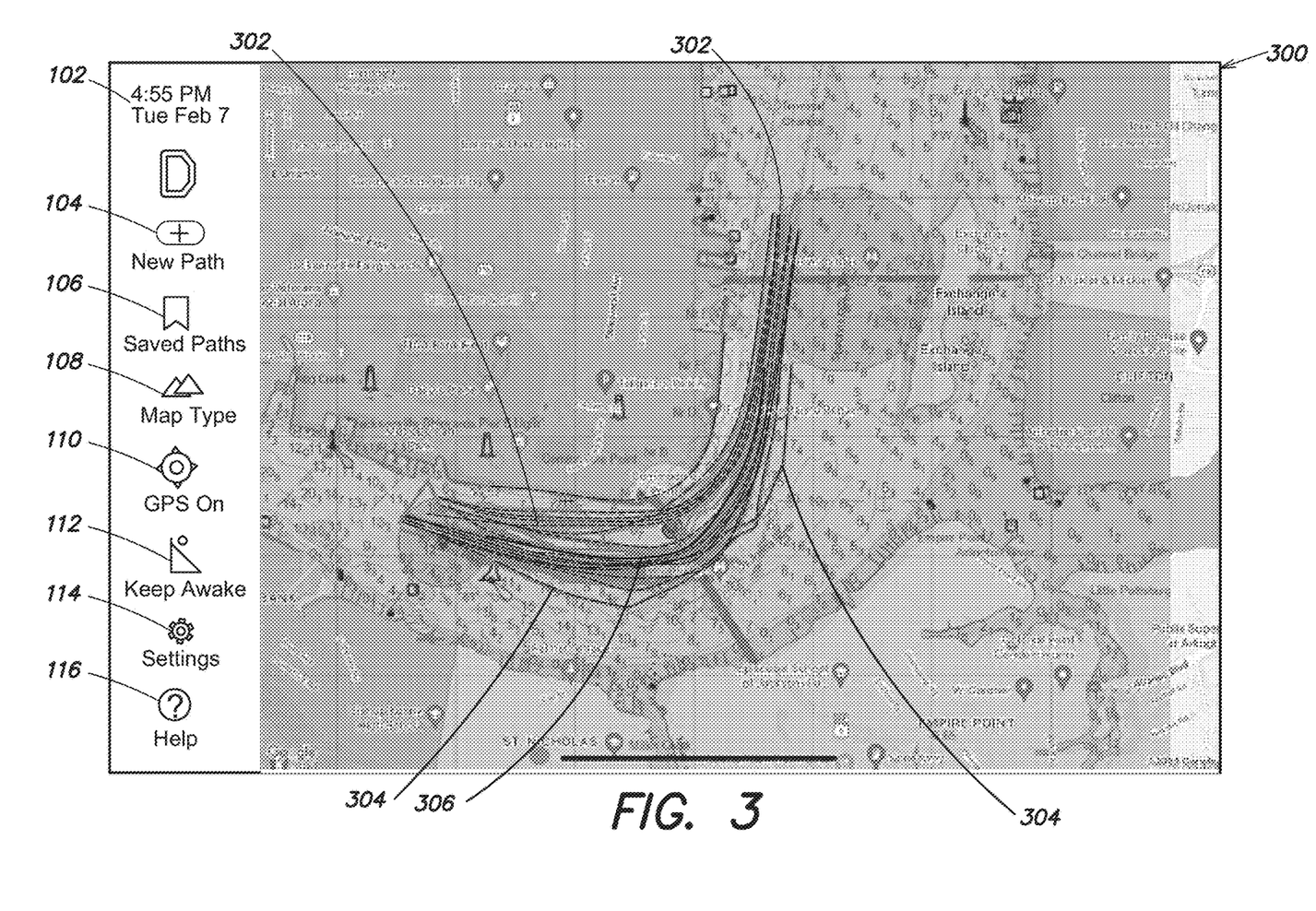
FIG. 3 shows an exemplary page of an exemplary interface displaying a map showing historical path information and a command bar.

FIG. 3 shows an exemplary page of an exemplary interface 300 displaying a map showing historical path information and a command bar that may be displayed after a user selects an original and destination of the desired historical routes. In one embodiment, this exemplary interface 300 includes a graphical representation of the paths that have been taken by other navigators between the origin and destination specified by a user. In one embodiment, the exemplary interface 300 identifies paths traveled by different types of navigators such as, for example, one group of paths taken in the past by experienced local captains 302, and a different group of paths taken in the past by other captains 304. In FIG. 3, the paths taken by experienced local captains 302 are represented by lines of dashes of equal length and the paths taken by other captains 304 are represented by lines of alternating dashes of two different lengths. In another embodiment the different groups of paths taken by different types of navigators may be represented by different colors on the interface 300. For example, the group of paths taken in the past by experienced local captains 302 may be shown in blue and the group of paths taken in the past by other captains 304 may be shown in gray.

In the manner, a user of the exemplary software application of the present invention may easily distinguish the paths taken in the past by local captains (e.g., local knowledge) from the paths taken in the past by captains who travel less frequently in the area. In the example shown in FIG. 3, the some routes traveled by the local captains pass more closely to the peninsula marked as Commodore's Point than the routes traveled by other captains who pass through this area less frequently. This exemplary information may be useful to a user trying to select an optimal route (e.g., the safest route). In FIG. 3, the optimal route 306 is represented by a solid line. In another embodiment, the exemplary interface 300 identifies paths 306 recommended by the exemplary software application of the present invention by a different color (e.g., orange) than paths traveled in the past by experienced local captains 302 and paths taken by captains who pass through the area less frequently 304.

In one embodiment, the exemplary interface 300 displaying a map showing historical path information and a command bar may also include names of the bodies of water (e.g., St. John's River, Terminal Channel) in the displayed map, names of bridges over a body of water (e.g., Hart Bridge, Matthews), point of interest associated with a body of water (e.g., points of interest-docks, harbors, and anchorages), and names of various places of interest on the land surrounding the body of water (e.g., Metropolitan Park, Bishop Kenney High School). In some embodiments for some regions, the exemplary interface 300 may also show relative water depths at various locations on the body of water. In one embodiment, the relative depths on the exemplary interface 300 may be represented by a color of the water (e.g., a lower depth represented by a lighter color, a higher depth represented by a darker color).

In one embodiment, the command bar of the exemplary interface 300 of FIG. 3 may include one or more of the following: a time and date 102, a New Path symbol 104, a Saved Paths symbol 106, a Map Type symbol 108, a Global Positioning System (GPS) On symbol 110, a Keep Awake symbol 112, a Settings symbol 114, and a help symbol 116.

Figure 4:
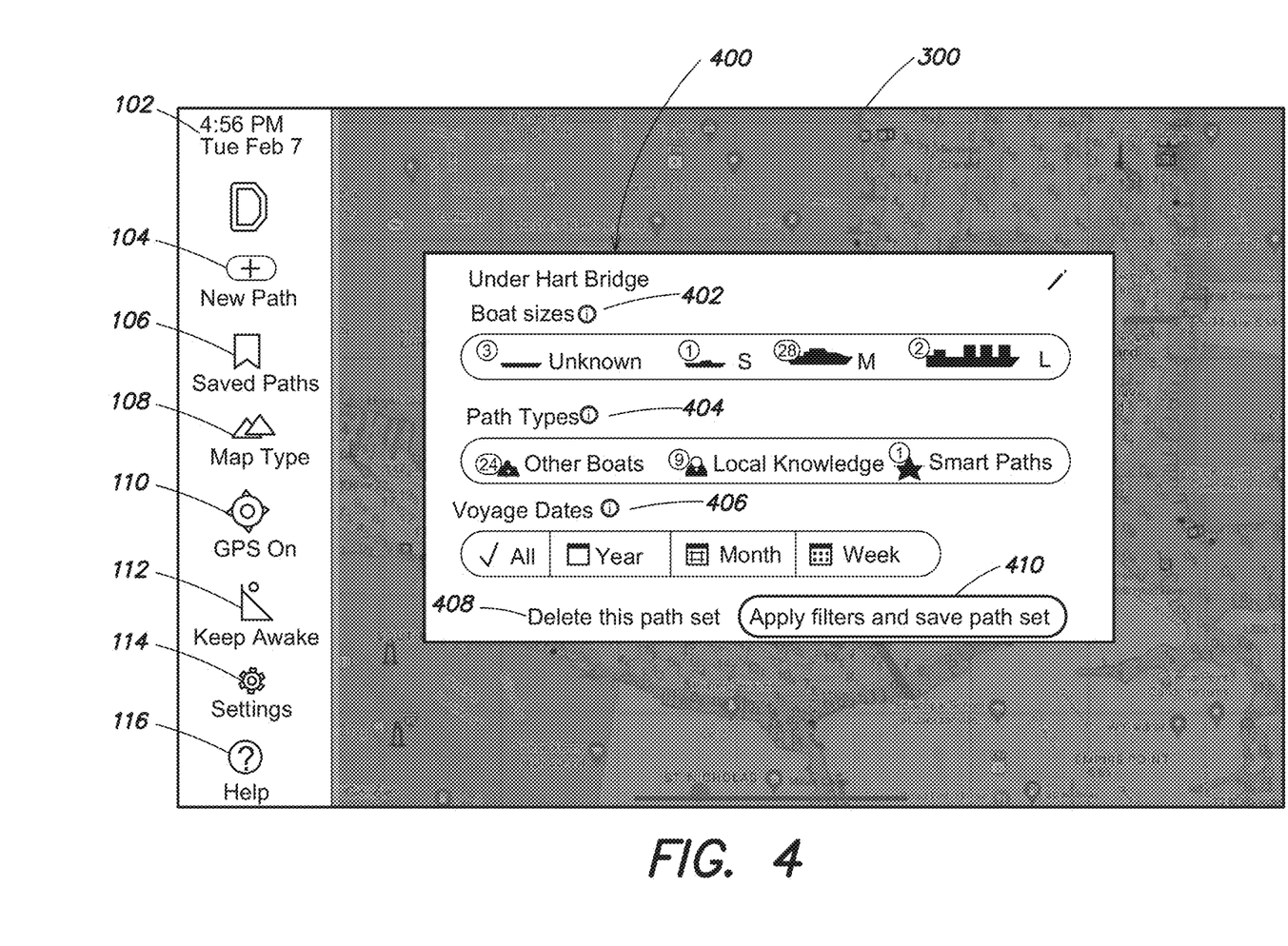
FIG. 4 shows an exemplary page of an exemplary interface displaying a filter enabling a user to specify filter criteria and to display historical path information that satisfies the specified criteria.

FIG. 4 shows an exemplary page of an exemplary interface displaying a filter 400 enabling a user to specify filter criteria and to display historical path information that satisfies the specified criteria. The user may select various options on the filter 400 to a) modify the end points to display a different set of paths or b) modify the paths for the current set of endpoints that will be shown by the interface. In one embodiment, a user may tap on exemplary interface 300 displaying a map showing historical path information shown in FIG. 3 to display the filter 400 shown in FIG. 4. The options on the filter 400 may include one or more of the following: boat size 402, the path type 404, and the voyage dates 406. In one embodiment, the boat size 402 may include one or more of the following: unknown, small, medium, and large. In one embodiment, the path type 404 may include paths taken by local experienced captains, paths taken by other inexperienced captains, or a path recommended by the software application (i.e., labeled as a Smart Path). In some embodiments, the voyage dates may include a year, month, and week. In some embodiments, the exemplary filter 400 of FIG. 4 may include options to "Delete this path set" 408 and to "Apply filters and save path set" 410.

Figure 5:
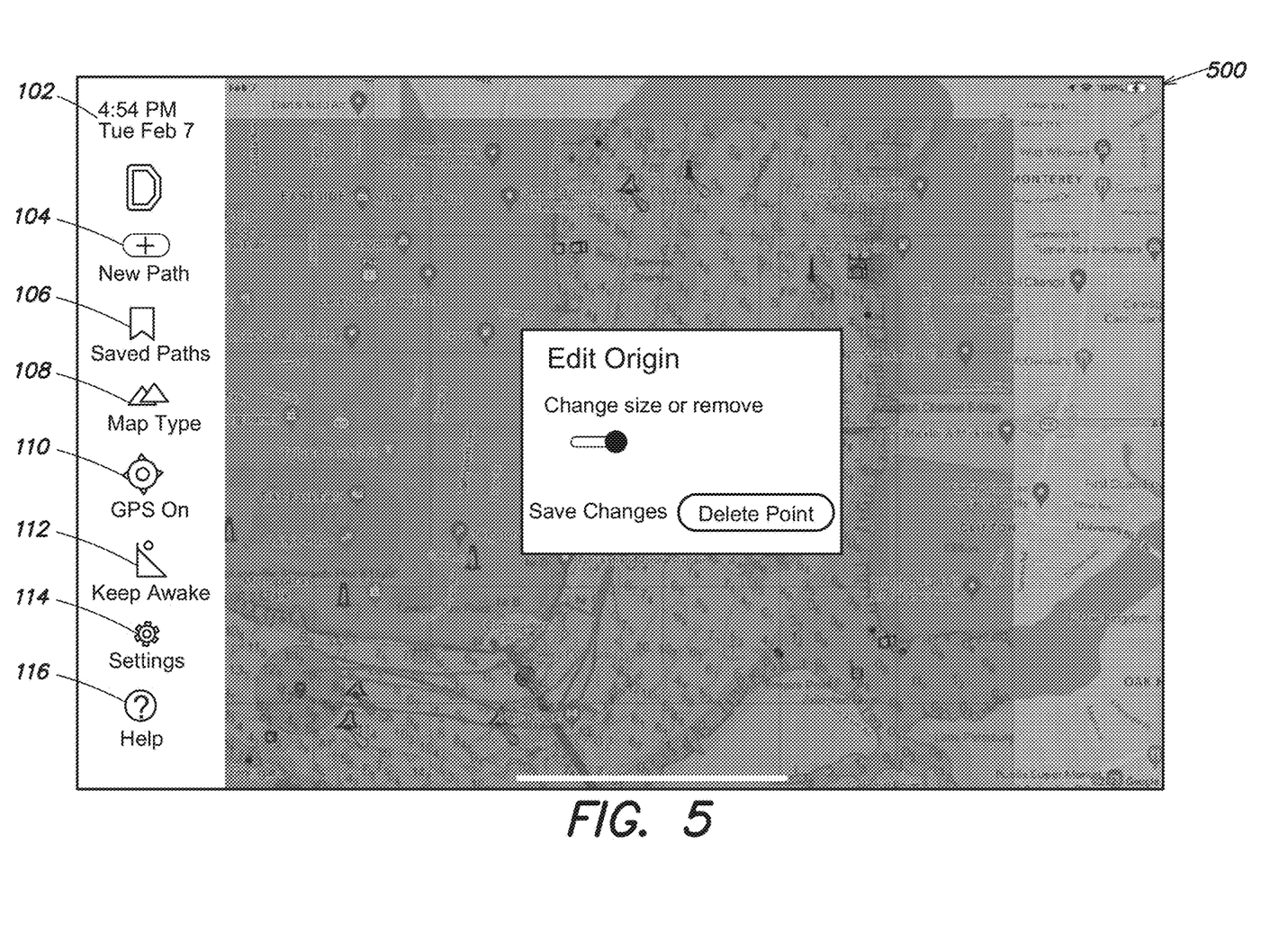
FIG. 5 shows an exemplary page of an exemplary interface enabling a user to select the start and end points for a path.

FIG. 5 shows an exemplary panel 500 on a page of an exemplary interface enabling a user to modify the start and end points for a path. In some embodiments of the interface of the present invention, an endpoint may be modified by dragging it to a different location. In some embodiments, a user may select an endpoint to display a panel 500 to perform various operations on the selected endpoint such as changing its size or removing it so that it may be placed at a different location. In one embodiment, changing the size of an endpoint affects the area over which the system of the present invention will fetch historical route data. In some embodiments, a user who is satisfied with the displayed historical paths may save them.

Figure 6:
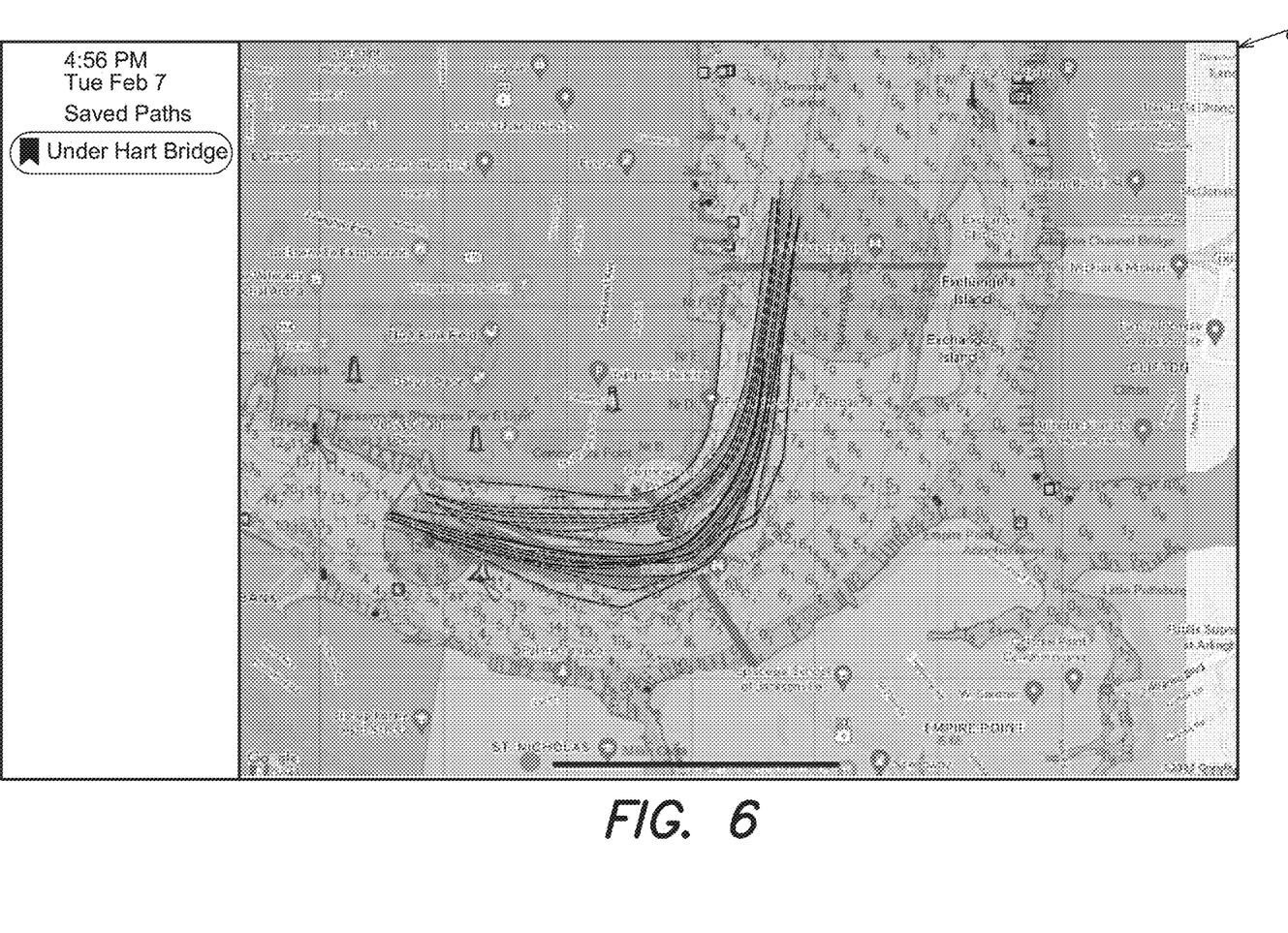
FIG. 6 shows an exemplary page of an exemplary interface displaying paths that were saved by a user.

FIG. 6 shows an exemplary page 600 of an exemplary interface displaying paths that were previously saved by a user. In some embodiments, a user may display previously saved paths by pressing the Saved Paths symbol on the command bar of the exemplary interface of the present invention. The saved paths may be reloaded by the user for navigation use, further edited, or deleted if they are no longer needed.

In some embodiments of the present invention, data associated with a user (e.g., saved historical paths) may be automatically synchronized with one or more servers. This feature enables a user who builds and saves paths to access them from any device. For example, a user might use a web version of the software application of the present invention on a computer at home to create and save a set of paths to plan a voyage and may later access those saved paths from any device (e.g., tablet, smart phone) while enroute aboard a boat.

In some embodiments of the interface of the present invention, a user may specify a plurality of intermediate points between the origin and the destination of the waterway and may request route guidance from a first one of the plurality of intermediate points to a second one of the plurality of points through the waterway. In some embodiments, a plurality of intermediate routes taken between the first one of the plurality of intermediate points and the second one of the plurality of intermediate points by a plurality of corresponding navigators may be displayed on a map of the waterway. In some embodiments, a determination as to whether at least one of the plurality of intermediate routes has been taken by at least one navigator having local knowledge of the waterway is made. In some embodiments, at least one recommended intermediate route from the first one of the plurality of intermediate points to the second one of the plurality of intermediate points may be displayed. In this manner, a user has the advantage of having more control over a longer auto guidance route, and the additional historical data points obtained by breaking up the route may contribute to better route generation. Accordingly, some embodiments construct a longer route based on shorter segments as dictated by the user such that each segment has a destination that may not be the final end point. This manner of construction allows more control over the recommended (smart) path between the origin and the final destination.

The present invention includes a plurality of categories of algorithms including (i) AIS raw data curation (ii) local knowledge categorization (iii) generation of recommended paths and (iv) application updates. One embodiment of the present invention displays historical boat paths using AIS data by finding a suitable balance between fixing dirty data and maintaining the data as close as possible to the original data from a source production system. One embodiment of the present invention includes categorization and filtering of raw AIS data during a data load. One embodiment includes efficient spatial search processes such as (i) detecting, correcting, and/or removing corrupt or inaccurate records by identifying duplicate, null and/or suspect data points and records, (ii) storing the data in a way that is indexed to optimize retrieval by both date-based partitioning with the most recent data being more readily available and by narrowing regions searched to those historically frequented by the vessels being queried (iii) server side caching of data sets that are most relevant and frequently accessed.

Optionally, the AIS data used by one embodiment of the present invention must pass a set of quality criteria including one or more of the following:

Range: Although some users may be interested in the most recent voyages, one embodiment of the present invention may maintain a significant amount of historic data to train prediction and categorization models, as described in detail below.

Mandatory Fields: Certain fields, such as Marine Mobile Service Identity (MMSI), must be accurately populated in order for the data to be useful in some embodiments of the present invention that generate uniqueness and foreign-key constraints such as Boat Path ID to ensure consistency across user queries. MMSIs are nine-digit numbers used by maritime digital selective calling (DSC), automatic identification systems (AIS) and certain other equipment to uniquely identify a ship or a coast radio station and are regulated and managed internationally by the International Telecommunications Union in Geneva, Switzerland, just as radio call signs are regulated, as explained in https://www.fcc.gov/wireless/bureau-divisions/mobility-division/maritime-mobile/ship-radio-stations/maritime-mobile, the contents of which are herein incorporated by reference. In some embodiments, fields such as Draft or Call Sign that are not used in key generation are allowed to be empty.

AIS data loaded by some embodiments of the present invention may be audited with the use of statistical and database methods to detect anomalies and contradictions. After executing the initial cleansing workflow at load time, the results may be inspected to verify correctness. Optionally, data scrubbing may be applied to further refine the data and prepare for analysis. For example, many small movements in a confined area may suggest that a vessel is anchored and therefore, may be removed from navigational consideration. Optionally, the data may then be transformed in a manner that is optimized for user query. Optionally, this step may include a mapping of the data from its given format to a format expected by the appropriate software application, value conversions, and normalizing numeric values to conform to minimum and maximum values. Optionally, the minimum necessary set of data may be returned to the application.

Although there are some software applications that consume AIS data for the purposes of vessel identification and collision detection and perform some level of validation, the validation routines of the present invention perform a higher level of validation including the evaluation of consistency among concurrent points in the dataset because the present invention, in contrast to these other software applications, uses AIS data to visualize routes. In some embodiments, examples of data validation include elimination of multiple same vessel paths and elimination of non-direct routes.

In some embodiments of the present invention, file-based AIS location and vessel data sourced by a data provider are loaded into a cloud-based staging database with a first tier of filters that strips out redundant entries and data points pertaining to vessels that are determined not to be navigating. In some embodiments of the present invention, location data is analyzed to determine region and metadata related to daily and annual vessel movements including minimum and maximum latitude and longitude. In some embodiments, metadata and daily vessel paths are extracted from the location data and stored with unique identifiers for rapid indexed searching. In some embodiments, path data may also be stored in a geospatial database. In some embodiments, further refinement of the paths including determination of multiple same vessel paths and elimination of non-direct routes may be performed at runtime in code, rather than the data store level.

In some embodiments of the present invention, overlapping data sets sourced from different providers may be processed by identifying common parameters or identifiers such as those from MMSI or the International Maritime Organization (ITM), as explained in https://www.imo.org/en/, the contents of which are herein incorporated by reference. In some embodiments, the present invention may bridge gaps in time series by interpolation or removing series with insufficient granularity or large reporting gaps. In some embodiments, the present invention may test AIS coordinates for accuracy using statistical methods, such as comparing inputs to training sets created using data with a known high degree of accuracy.

In some embodiments, the present invention may include local knowledge categorization to identify boat voyages captained by individuals who have better than average knowledge of the area they are navigating. In some embodiments, a categorization model analyzes the navigation patterns of each vessel in the area of interest and upon determining that the vessel has frequently navigated in a neighboring region of a requested route, is identified as having local knowledge. In some embodiments, the categorization model applies statistical methods to historical data to categorize a boat as being local to a given geographical area of interest.

In some embodiments, the categorization model may determine how often the user-supplied origin and/or destination points are frequented by the vessels that have transited the same route. In some embodiments, the local territory of a reference vessel may be determined by analyzing data that may be outside the date range of the current search. In some embodiments, a path is marked as having local knowledge if the frequency of visits to the area of interest exceeds a threshold of familiarity.

In some embodiments, additional factors may be considered in determining whether a path is marked as having local knowledge including characteristics about the area of interest such as whether it is a harbor in a densely populated area or is a deep area with sudden and unpredictable shallows that is infrequently traversed by large vessels, etc. In some embodiments, data relevant to these characteristics about the area or interest such as the frequency with which a vessel has traveled within the area or the vessel's home port, may be retrieved, and considered. In some embodiments, scores measuring the level of local knowledge may be determined. In some embodiments, scores may range from a value of 0 representing no local knowledge to a value of 10 representing level of local knowledge with high confidence. In some embodiments, a user may select a degree of relevance of local knowledge on a sliding scale with a slider control on an interface of an embodiment of a software application of the present invention.

In some embodiments of the present invention, a recommended route or path from a selected origin to a selected destination may be determined using a curve fitting process in which constructs a curve of mathematical function that best fits a set of data points. In some embodiments, a curve or function with a best fit may be obtained using paths of similar vessels that have traversed the same or similar route. In some embodiments, the recommended route may be visually identified among a set of historical boat paths fetched by a user. In some embodiments, any route including recommended routes, regular routes or routes traveled by navigators having local knowledge may be a single route condensed from multiple paths. In some embodiments, statistical methods may be used to generate a suggested route based on historical marine travel data.

In some embodiments, a curve may be fit to a set of data points based on multiple paths taken by a vessel in its history through the same origin/destination points or within a predetermined distance from the same origin/destination points. In some embodiments, paths that are outliers based on actual distance traveled relative to a straight line distance, a distance traveled relative to peer paths on the same route, speed over ground, and/or the existence of any substantial data reporting gaps, may be removed. In some embodiments, routes deemed to have local knowledge may be weighted more heavily and therefore, have a greater influence in determining a recommended path.

In some embodiments, a user may be prompted to reroute when significant changes occur between the time a path set was saved and the time of voyage. In some embodiments, data for the set of saved paths may be compared with data for a path requested at the time of the voyage. In some embodiments, artificial intelligence (AI) may be used in determining a suggested path. In some embodiments, AI may be used to perceive, synthesize, and/or suggest paths using methods that do not require real-time human intervention. In some embodiments, machine learning algorithms that use supervised or unsupervised training sets may be used. In some embodiments, training sets may grow in size as the system of the present invention is used.

Conventional marine navigation systems may be difficult to update. Data-based updates such as new navigation charts may be slow and non-intuitive and/or code-based software updates may be even worse and, in some cases, may be so complex for non-computer-savvy users so that they are either dissuaded from making updates or required to pay a service provider to do the update for them. In some embodiments of the present invention, updates for chart data, routing data, software, algorithms, etc. may be updated preemptively in the background without user involvement. In some embodiments, one or more of these updates may be disabled when Wi-Fi is not available. In some embodiments, algorithms may be seamlessly shareable between the server and the software application.

In some embodiments, algorithms such as those generating a path recommendation or classifying local knowledge may be performed by a server to take advantage of superior processing power and broader access to data inputs. In situations such as such as bad weather or remote geographies where network bandwidth is insufficient to provide a satisfactory user experience, however, the present invention may switch to a local processing mode in which certain algorithms are executed by the software application on a user's device (e.g., mobile smart phone, laptop). In some embodiments, a switch from a mode in which a server executes the algorithms to a local processing mode may be transparent to a user. To ensure that algorithms executing at the server and the client's device are consistent, a programmatic interface template may be employed to allow developers to create new algorithms in a single design. In some embodiments, a cross-platform Python library running on servers, a web-based client, an Android device, and/or Apple device may be used for the programmatic interface template. In some embodiments, a library such as Starflut may be used. The Starflut library is a specialized package that includes platform-specific implementation code for all available client hardware platforms, as explained in https://github.com/srplab/starcore_for_flutter, the contents of which are herein incorporated by reference in their entirety.

Figure 7:
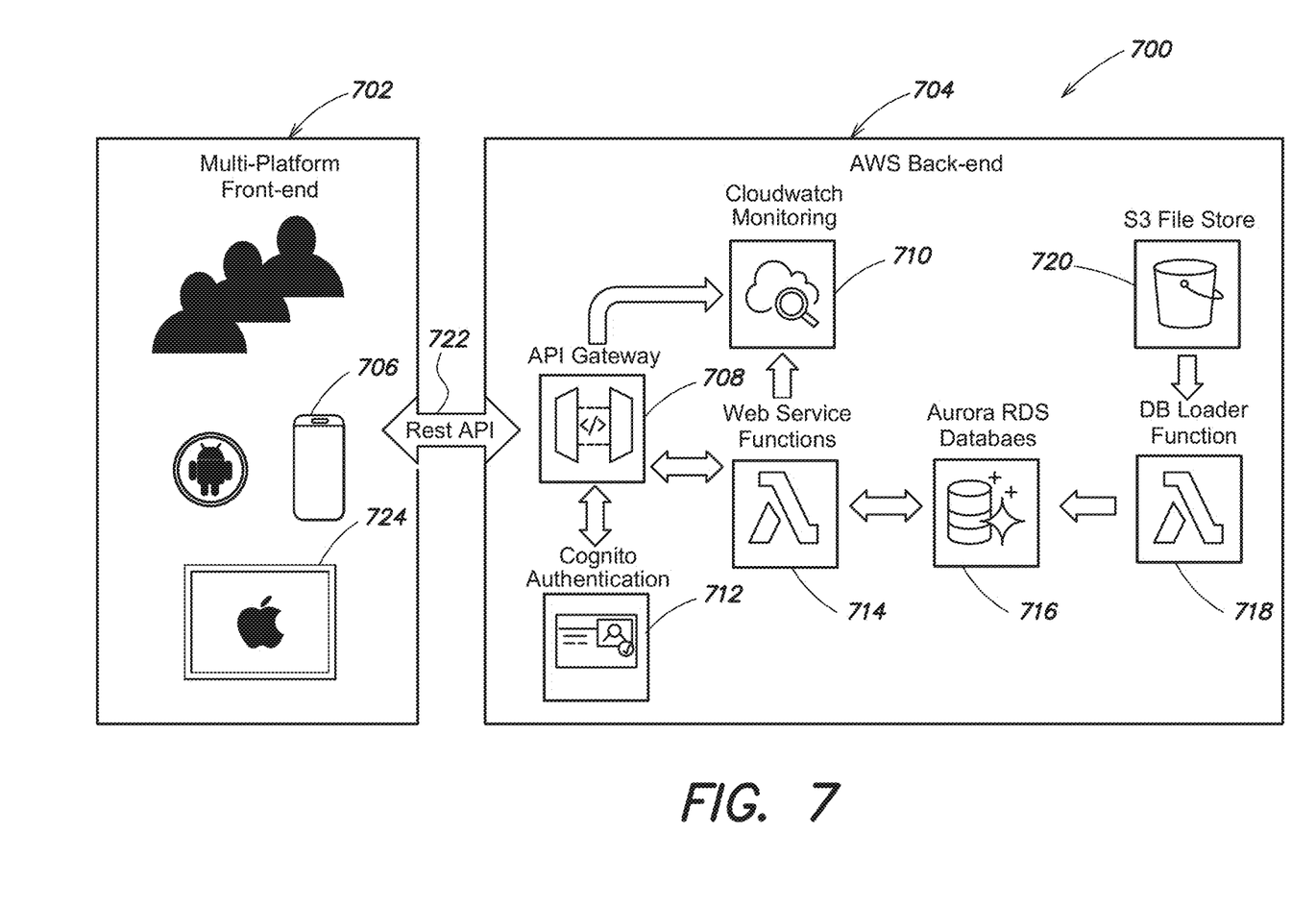
FIG. 7 shows a diagram of various components of an exemplary multi-platform front end and back end of a scalable cloud-based architecture of an exemplary system of the present invention.

FIG. 7 shows a diagram of various components of an exemplary multi-platform front end 702 and back end 704 of a scalable cloud-based architecture 700 of an exemplary system of the present invention. The exemplary multi-platform front end 702 may include a mobile device 706, a tablet 724, and a laptop. The mobile device may be an Apple device, an Android device, etc. The tablet may be an Apple device. The back end 704 may include cloud based services such as Amazon Web Services, as discussed in https://aws.amazon.com/, the contents of which are herein incorporated by reference in their entirety. The back end 704 may further include an Application Programming Interface (API) gateway 708, a cloud watch monitoring module 710, an authenticator 712 such as a Cognito authentication, a web services function 714, a database 716 such as an Aurora RDS database, a database loader function 718, and/or a S3 file store 720. In some embodiments, the API gateway 708 may communicate with the cloud watch monitoring module 710, the authenticator 712, and or the web services function 714. In some embodiments, the cloud watch monitoring module 710 may communicate with the web services function 714. In some embodiments, the web services function 714 may communicate with the database 716, which may also communicate with the database loader function 718, which may also communicate with the S3 file store 720. The multi-platform front end 702 may communicate with the back end 704 via an API interface 722.

Figure 8:
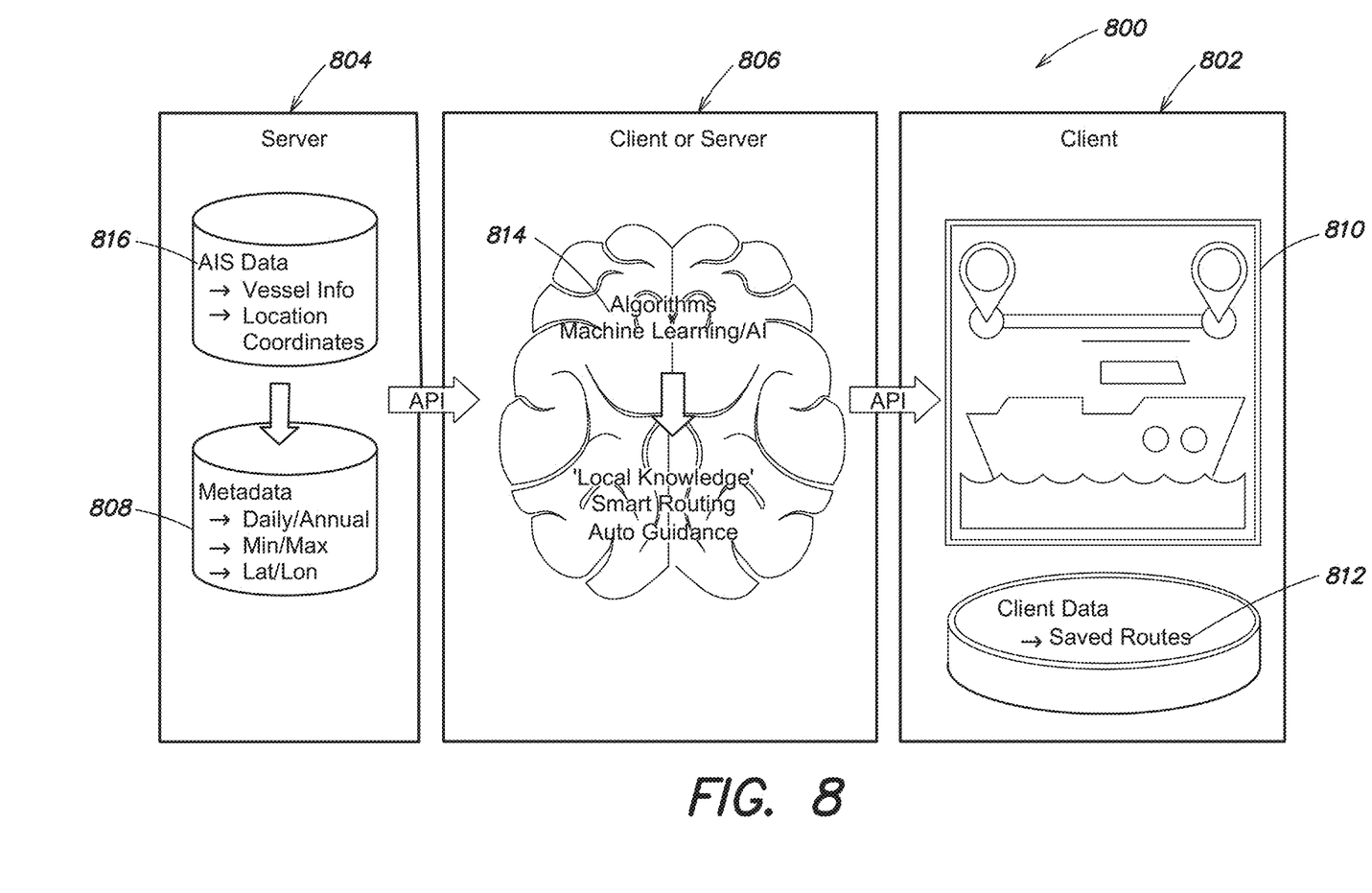
FIG. 8 shows a diagram of an exemplary client-server-based architecture of an exemplary system of the present invention.

FIG. 8 shows a diagram of an exemplary client-server-based architecture 800 of an exemplary system of the present invention. The client-server-based architecture 800 may include some components on a client 802 and a server 804, and/or some components that may be located on either the client or the server 806. The components that may be located on a server 804 include AIS data 816 including vessel information and location coordinates, and/or various metadata 808. The components that may be located on the client 802 may include an application 810 displaying one or more recommended routes on a map and a set of saved routes 812 for a user. The components that may be located on either the client or the server 806 may include algorithms 814 for determining recommended routes and identifying vessels associated with local knowledge. These algorithms may be based on artificial intelligence and/or machine learning.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be understood that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be understood that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be understood that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a similar name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system for providing route guidance through a waterway to a user, the system comprising:
    a computer hardware processor; and
    a non-transitory computer-readable storage medium storing instructions that, when executed by the computer hardware processor, cause the computer hardware processor to perform:
        displaying, on an interface comprising a plurality of display elements, a map of the waterway and surrounding area;
        receiving an origin and a destination on the waterway from the user;
        displaying, on the interface, a control enabling the user to request route guidance from the origin to the destination through the waterway;
        displaying on the map of the waterway a plurality of routes taken between the origin and destination by a plurality of corresponding navigators;
        determining whether at least one of the plurality of routes has been taken by at least one of the plurality of navigators having local knowledge of the waterway, wherein the plurality of navigators having local knowledge of the waterway is identified by a categorization model trained on a plurality of navigation patterns, in a given geographical area, taken by a plurality of corresponding navigators; and
        displaying, on the interface and based on the determination by the categorization model, at least one recommended route from the origin to the destination.

2. The system for providing route guidance through a waterway to a user of claim 1, wherein the instructions further cause the computer hardware processor to perform:
    upon determining that the at least one of the plurality or routes has been taken by the at least one of the plurality of navigators having local knowledge of the waterway, identifying the at least one of the plurality of routes by displaying, on the interface, the at least one of the plurality of routes with a first predetermined color.

3. The system for providing route guidance through a waterway to a user of claim 1, wherein the instructions further cause the computer hardware processor to perform:
    displaying the at least one recommended route from the origin to the destination with a second predetermined color.

4. The system for providing route guidance through a waterway to a user of claim 1, wherein the instructions further cause the computer hardware processor to perform:
    displaying one or more options for filtering the plurality of routes taken between the origin and destination by the plurality of corresponding navigators.

5. The system for providing route guidance through a waterway to a user of claim 4, wherein the one or more options for filtering the plurality of routes taken between the origin and destination by the plurality of corresponding navigators comprises one or more boat specifications including length, draft, vessel type, and commercial/recreational, a route type, and a route date.

6. The system for providing route guidance through a waterway to a user of claim 5, wherein the boat length comprises a plurality of values comprising small, medium, and large.

7. The system for providing route guidance through a waterway to a user of claim 5, wherein the route type has a plurality of possible values representing local knowledge and recommended route.

8. The system for providing route guidance through a waterway to a user of claim 1, wherein the instructions further cause the computer hardware processor to perform:
    displaying one or more options for the origin and the destination.

9. The system for providing route guidance through a waterway to a user of claim 8, wherein the one or more options for the origin and destination comprise a location and an area range surrounding the location.

10. The system for providing route guidance through a waterway to a user of claim 1, wherein the map of the waterway and surrounding area comprises a normal, satellite, or bathymetric nautical navigation view.

11. The system for providing route guidance through a waterway to a user of claim 1, wherein the instructions further cause the computer hardware processor to perform:
receiving a plurality of intermediate points between the origin and the destination on the waterway from the user;
displaying, on the interface, a control enabling the user to request route guidance from a first one of the plurality of intermediate points to a second one of the plurality of points through the waterway;
displaying on the map of the waterway a plurality of intermediate routes taken between the first one of the plurality of intermediate points and the second one of the plurality of intermediate points by a plurality of corresponding navigators;
determining whether at least one of the plurality of intermediate routes has been taken by the at least one of the plurality of navigators having local knowledge of the waterway; and
displaying, on the interface, at least one recommended intermediate route from the first one of the plurality of intermediate points to the second one of the plurality of intermediate points.

12. A method for providing route guidance through a waterway comprising:
receiving an origin and a destination on a waterway;
receiving data relating to a plurality of routes taken between the origin and the destination by a plurality of corresponding navigators;
determining whether at least one of the plurality of routes has been taken by at least one of the plurality of navigators having location knowledge of the waterway, wherein the plurality of navigators having local knowledge of the waterway is identified by a categorization model trained on a plurality of navigation patterns, in a given geographical area, taken by a plurality of corresponding navigators; and
determining, on the interface and based on the determination by the categorization model, at least one recommended path from the origin to the destination based on the at least one of the plurality of routes.

13. The method for providing route guidance through a waterway of claim 12 further comprising:
filtering at least a portion of the data relating to a plurality of routes taken between the origin and the destination by a plurality of corresponding navigators that does not satisfy one or more criteria.

14. The method for providing route guidance through a waterway of claim 13 wherein said criteria comprises one or more of: a boat size, a voyage date, a direct path from the origin to the destination, and non-redundancy.

15. The method for providing route guidance through a waterway of claim 12 wherein the data relating to a plurality of routes taken between the origin and the destination by a plurality of corresponding navigators originates from one or more sources.

16. The method for providing route guidance through a waterway of claim 15 wherein the one or more sources comprises automatic identification system (AIS).

17. The method for providing route guidance through a waterway of claim 12 wherein identifying at least one of the plurality of routes taken by at least one of the plurality of navigators having location knowledge of the waterway comprises:
determining that the at least one of the plurality of routes taken by at least one of the plurality of navigators has the location knowledge if said at least one of the pluralities of navigators has traveled in an area of the origin and destination a predetermined number of times or has a home port near the area of the origin or the destination.

18. The method for providing route guidance through a waterway of claim 12 further comprising:
determining a score measuring an amount of the local knowledge for the at least one of the navigators having local knowledge of the waterway.

19. The method for providing route guidance through a waterway of claim 18 wherein the determining at least one recommended path from the origin to the destination is also based on the score measuring an amount of the local knowledge for the at least one of the navigators having local knowledge of the waterway.

20. The method for providing route guidance through a waterway of claim 12 wherein the determining at least one recommended path from the origin to the destination comprises:
performing curve fitting of the plurality of routes taken between the origin and the destination by a plurality of corresponding navigators.

21. The method for providing route guidance through a waterway of claim 12 further comprising:
receiving a plurality of intermediate points between the origin and the destination on the waterway from the user;
receiving data relating to a plurality of intermediate routes taken between a first one of the plurality of intermediate points and a second one of the plurality of intermediate points by a plurality of corresponding navigators;
determining whether at least one of the plurality of intermediate routes has been taken by the at least one of the plurality of navigators having local knowledge of the waterway; and
determining a least one recommended intermediate path from the first one of the plurality of intermediate points to the second one of the plurality of intermediate points based on the at least one of the plurality of intermediate routes.

22. A non-transitory computer-readable storage medium media comprising instructions that, when executed by one or more processors on a computing device, are operable to cause the one or more processors to execute:
receiving an origin and a destination on a waterway;
receiving data relating to a plurality of routes taken between the origin and the destination by a plurality of corresponding navigators;
determining whether at least one of the plurality of routes has been taken by at least one of the plurality of navigators having location knowledge of the waterway, wherein the plurality of navigators having local knowledge of the waterway is identified by a categorization model trained on a plurality of navigation patterns, in a given geographical area, taken by a plurality of corresponding navigators; and
determining, on the interface and based on the determination by the categorization model, at least one recommended path from the origin to the destination based on the at least one of the plurality of routes.

* * * * *

UNITED STATES PATENT AND TRADEMARK OFFICE
CERTIFICATE OF CORRECTION

| | | |
|---|---|---|
| PATENT NO. | : 12,429,339 B2 | Page 1 of 1 |
| APPLICATION NO. | : 18/143826 | |
| DATED | : September 30, 2025 | |
| INVENTOR(S) | : Owen Davies et al. | |

It is certified that error appears in the above-identified patent and that said Letters Patent is hereby corrected as shown below:

On the Title Page

At item (54), the title is hereby corrected as shown below:
--(54) SYSTEM AND METHODS FOR ROUTE GUIDANCE THROUGH A WATERWAY--

In the Specification

At Column 1, the title is hereby corrected as shown below:
--SYSTEM AND METHODS FOR ROUTE GUIDANCE THROUGH A WATERWAY--

In the Claims

At Column 16, Claim 22, Line 45:
"media comprising instructions that, when executed by one or"
Should read:
--comprising instructions that, when executed by one or--

Signed and Sealed this
Twenty-third Day of December, 2025

John A. Squires
*Director of the United States Patent and Trademark Office*